Figure 1:
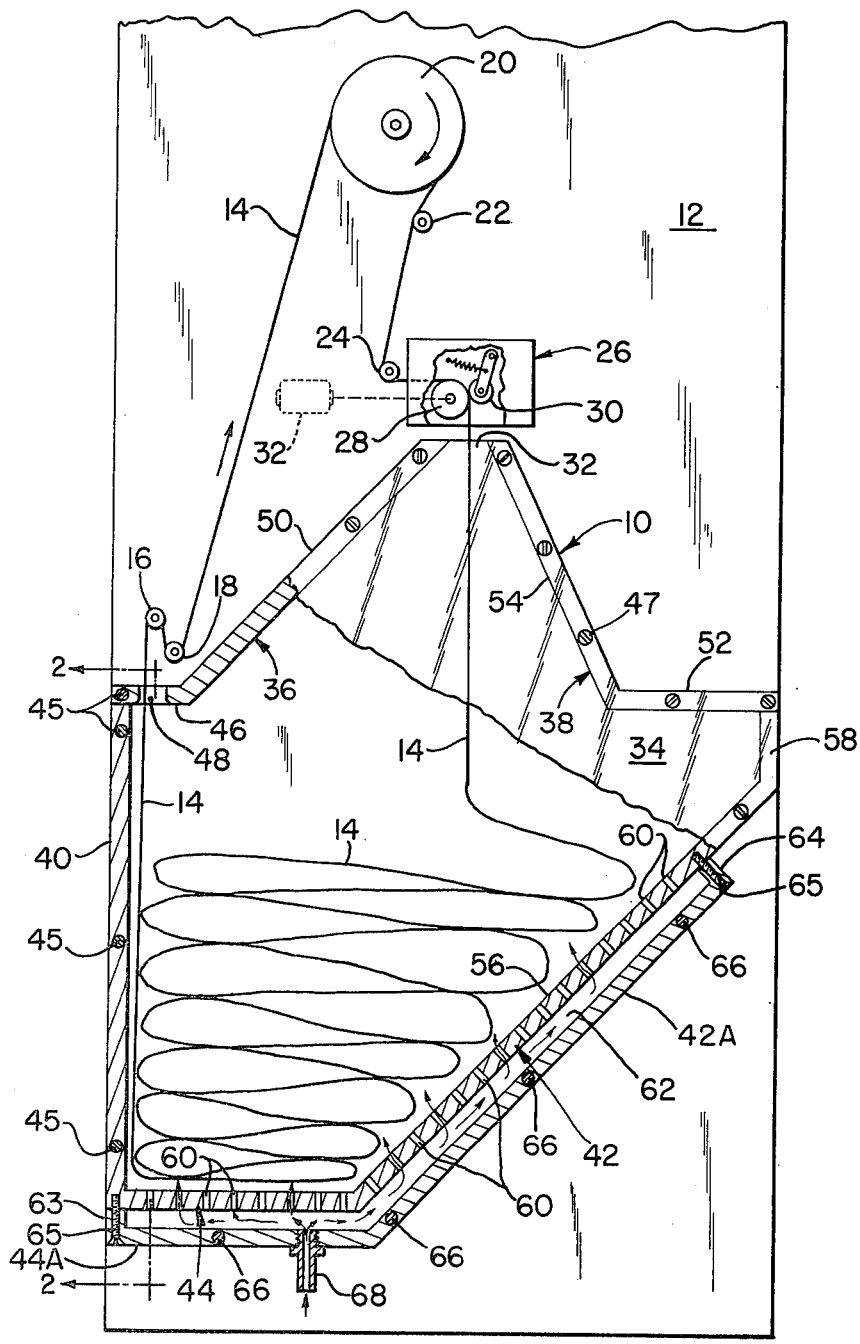

United States Patent [19]
King

[11] 4,127,225
[45] Nov. 28, 1978

[54] TAPE STORAGE BIN

[75] Inventor: James L. King, Sudbury, Mass.

[73] Assignee: King Instrument Corporation, Westboro, Mass.

[21] Appl. No.: 771,206

[22] Filed: Feb. 23, 1977

Related U.S. Application Data

[63] Continuation of Ser. No. 621,508, Oct. 10, 1975, abandoned.

[51] Int. Cl.² .......................................... B65H 17/50
[52] U.S. Cl. .................................... 226/118; 226/97
[58] Field of Search .................. 226/118, 119, 97; 242/182, 183, 184, 185

[56] References Cited

U.S. PATENT DOCUMENTS

| 667,436 | 2/1901 | Granichstaedten | 226/118 |
| 2,504,554 | 4/1950 | Lindsay | 226/118 X |
| 3,340,369 | 9/1967 | Seidl | 226/118 X |
| 3,528,593 | 9/1970 | Armstrong et al. | 226/118 X |

FOREIGN PATENT DOCUMENTS 950,987  3/1964  United Kingdom ................. 226/119

Primary Examiner—Bruce H. Stoner, Jr.
Attorney, Agent, or Firm—Schiller & Pandiscio

[57] ABSTRACT

An improved storage bin is provided for storing a flexible tape so that it can be moved in and out of the bin at relatively high speeds. Air is injected to establish a vertical pressure gradient to support the tape in the bin, and the bin has a tapered geometrical construction designed so that when an air pressure gradient is provided in the bin, the tape material will form natural folds as it accumulates in the bin.

6 Claims, 2 Drawing Figures

TAPE STORAGE BIN

This application is a continuation of my copending application Ser. No. 621,508 filed Oct. 10, 1975, now abandoned, for Tape Storage Bin.

This invention relates to storage devices and more particularly to storage bins for storing excessive lengths of magnetic tape, motion picture film and other tape or strip materials which are capable of moving in and out of the bins at relatively high speeds.

The present invention is particularly useful in the high-speed duplication of video tape, as well as multi-channel audio tapes, as for example, four and eight channel magnetic cartridge tapes. Various systems for providing high-speed duplication of audio tape are known. One of these audio tape reproduction systems generally employs a master tape which is provided with the information to be duplicated and at least one slave tape on which the information is reproduced with the master tape formed as an endless loop in order to eliminate rewinding, stopping and rethreading the master tape. The endless loop can thus be run continuously at relatively high speeds, e.g. 240 inches per second through a duplicating station. The master tape may be quite long, for example, 50 or 100 feet, and in such case care must be taken to prevent breaking or tangling of the tape. Also it is desirable to provide means for condensing the space occupied by the master tape, particularly when it is in use. Thus, many systems include a tape storage bin positioned near the duplicating station and arranged so that the master tape may be fed into the duplicating station from the bin, duplicated and fed back into the bin, all on a continuous basis. Usually, the master tape is allowed to fall to the bottom of the bin where it accumulates as a series of back and forth folds. However, existing bins present problems and are not suitable for handling relatively large size tape, e.g. video or computer tape. In existing tape storage bins the tape tends to become scratched as a result of frictional engagement with the walls of the bin. Further, the tape may twist and tangle, increasing the chances that the master tape will tear or break or become scratched by frictional engagement of one portion with the edge of another portion, especially since the tape is moving at a relatively high speed. Also existing storage bins tend to limit the speed at which the tape can be transported to and from the duplicating station.

Therefore, a general object of the present invention is to overcome the aforementioned limitations of prior systems.

More specifically, it is an object of the present invention to provide an improved storage bin for storing a magnetic tape or other strip material so that the latter can be moved in and out of the bin at relatively high speeds without twisting, tangling and tearing.

It is another specific object of the present invention to provide an improved tape storage bin which stores the tape in an ordered manner.

A further object of the present invention is to provide an improved storage device for pneumatically supporting a multi-folded long section of video magnetic tape or other strip material so that the latter can be moved in and out of the device at a high speed.

The foregoing and other objects of the present invention are achieved by a storage device which comprises substantially parallel front and rear walls spaced from one another by a distance slightly greater than the width of the tape to be stored; a bottom wall and first and second side walls connecting the front and rear walls so as to form a tape storage compartment. The side walls form a tapered structure wherein the first side wall is inclined so as to converge toward the second side wall in the direction of the bottom wall. Guide means are provided for guiding the tape into and out of the storage compartment. Means are also provided for establishing a pneumatic pressure gradient in the storage compartment so as to pneumatically support the tape above the bottom and first side walls, and also to urge the tape entering the device to tend to form a natural fold as it accumulates.

Other features and many attendant advantages of the invention are described or rendered obvious by the following detailed description which is to be considered together with the accompanying drawing.

Figure 2:
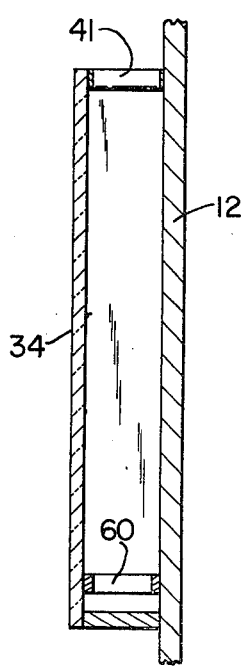

FIG. 1 is a front elevation, partly in section, of a preferred embodiment of the present invention; and FIG. 2 is a cross-sectional view taken along line 2—2 of FIG. 1.

Referring to the drawing, a storage bin designed in accordance with the present invention and indicated generally at 10, is shown in use with a system for high speed duplication of tapes or strip materials such as audio and video tapes. In such systems, an endless master tape 14 having prerecorded information thereon is typically guided by rollers 16 and 18, wheel 20 and guide rollers 22 and 24 to a duplicating or recording station 26, the rollers, wheel and station typically being mounted on shafts attached to a base plate 12. The duplicating station, 26, which does not form a part of the present invention and thus is shown only schematically, typically, comprises a capstan 28 which guides and controls the motion of the tape 14 through the station 26, a pressure idler 30 which maintains the frictional engagement between the tape 14 and the capstan 28, and a motor 32 for rotating the capstan 28 to move the tape through the station 26. As the master tape 14 moves through the station 26, the information recorded thereon is duplicated on one or more slave tapes (not shown) by means (not shown) in a manner well known in the art. By way of example but not limitation, duplication may be effected by magnetically sensing the information on the master tape and magnetically recording the playback signal on a slave tape. The master tape 14 moves directly from duplicating station 26 to the bin 10 through a tape inlet aperture 32. The length of the portion of tape 14 which is present in the bin 10 at any time is preferably at least twice the average height of the bin in order to achieve the advantages of the present invention, and typically is at least an order of magnitude greater.

The bin 10 includes a rear wall, which may be a portion of base plate 12 as shown, and a front wall 34 which is mounted parallel to and spaced from the base plate 12 a distance which is slightly greater than the width of master tape 14 so that the tape may move down through the bin with its broad sides extending at a right angle to the base plate, thereby assuring that the tape will not hang up or be twisted as a result of contact with the front and rear walls. The front wall is maintained in this spaced relationship to baseplate 12 by first and second top walls sections 36 and 38 which define the top of the bin, first and second side wall sections 40 an 42 which form opposite sides of the bin, and a bottom wall section 44 which defines the bottom of the bin. Preferably the wall sections 36, 38, 40, 42 and 44 are secured to baseplate 12 by screws 45 whose heads are flush or recessed in the forward surfaces of the wall sections. The front wall 34 is attached to the top, side and bottom wall sections by any suitable means such as screws 47. Front wall 34 is preferably made of a hard, durable transparent material, such as any one of several polycarbonate or acrylate resins, so that the operater can observe the tape 14 in the bin.

The first top wall section 36 includes a horizontally-disposed portion 46 having a tape outlet aperture 48, and an inclined portion 50 which extends upward from the portion 46 and terminates as one side of tape inlet aperture 32. Similarly, the second top wall section 38 has a horizontally-disposed portion 52 and an inclined portion 54 which extends from the horizontally-disposed portion 52 and terminates as the opposite side of inlet 32. The inclined portions 50 and 54 thus form a tapered mouth at the top of the bin with the width of the mouth increasing with increasing distance from the inlet 32. The depth of the tapered mouth thus formed is preferably set to permit the moving master tape to undergo a predetermined amount of free fall which enables it to fold in an orderly manner as described in greater detail hereinafter.

The first side wall section 40 is preferably disposed vertically between the horizontally-disposed portion 46 of the top wall section 36 and the bottom wall section 44. The second side wall section 42 includes an inclined portion 56 which is affixed to and inclined at an obtuse angle with respect to the bottom wall section 44. Side wall section 42 is inclined so that the width of the bin between the portion 56 of the side wall section 42 and side wall section 40 increases from the bottom of the bin toward the top. In the preferred embodiment, the portion 56 of the sidewall section 42 is inclined at an approximate 135° angle with respect to the bottom wall 44, although it will be appreciated that this angle can vary as much as 20°. The second side wall section 42 also preferably, but not necessarily, includes a vertically-disposed portion 58 which connects the inclined portion 56 with the horizontally-disposed portion 52 of the top wall section 38. In this preferred embodiment, the bottom wall section 44 and the inclined side wall portion 56 are provided with apertures 60 for admitting a pneumatic fluid under pressure into the bin. Preferably but not necessarily, the apertures are of equal size and are equally spaced.

Means also are provided for supplying a pneumatic fluid under pressure to the apertures 60. Such means preferably is in the form of a manifold chamber 62 which is formed by auxiliary wall sections 42A and 44A which are spaced from wall sections 42 and 44 by end wall sections 63 and 64. Wall sections 42A and 44A are integral with one another and end sections 63 and 64 and the latter are secured to the bottom and side wall sections 44 and 42 and plate 12 with screws 65 and 66. The front wall overlies and is secured to wall sections 42A, 44A, 63 and 64 so as to close off the manifold chamber. The manifold wall section 44A is provided with a screw-threaded fitting 68 which can be connected to a source of a pressurized air such as an air compressor (not shown) as is well known in the art.

Operation of the illustrated apparatus will now be described. Assume that the master tape 14 has been threaded over rollers 16 and 18, wheel 20, guide rollers 22 and 24, and through the duplication station 26 and the inlet and outlet apertures 32 and 48 of the bin, with the excess tape within the bin being untangled and not knotted or pinched between the front wall and the top, side, and bottom wall sections. A pressurized pneumatic fluid such as air is introduced at a controlled rate through the fitting 68 into manifold chamber 62. The air passes from the manifold chamber 62 into the bin via apertures 60 so as to provide a pressure gradient in the bin, with the pressure decreasing with increased distance from the apertures 60 in the bottom wall section 44 and side wall portion 56. As a result the excess tape accumulated in the bottom of the bin is fluidized, or more specifically, pneumatically supported by an "air cushion" provided by the air entering the bin 10 through apertures 60. The motor 32 is then operated so that capstan 28 will feed the master tape through the duplication station 26.

As the duplication process continues and the tape enters and leaves the bin through inlet 32 and outlet 48, respectively, the excess master tape is neatly folded in a configuration of substantially horizontal layers which substantially conform to the shape of the bin between the side wall section 40 and side wall portion 56, with the tape entering the bin through inlet 32 automatically forming new successive folds at the top of the configuration, and the tape exiting the bin through the outlet 48 being made available by depletion of the folds at the bottom of the bin. The tape can be moved in and out of the bin at relatively fast speeds e.g. 240 inches/second, and the excess tape is stored without twisting or tangling and with a minimum risk of tearing or breaking.

Since certain changes may be made in the above apparatus without departing from the scope of the invention herein involved, it is intended that all matter contained in the above description or shown in the accompanying drawing shall be interpreted in an illustrative and not in a limiting sense.

What is claimed is:

1. In combination with tape handling apparatus, a bin for accumulating and temporarily storing tape while the tape is being moved at relatively high speeds, said bin comprising:

front and rear walls disposed substantially parallel to one another and spaced apart by an amount slightly greater than the width of said tape;

a bottom wall including a first plurality of apertures and connecting said front and rear walls at the bottom of said bin;

a first side wall connecting said front and rear walls;

a second side wall including a second plurality of apertures and connecting said front and rear walls and being longer than and inclined with respect to said bottom wall and said first side wall so that the width of said bin between said first and second side walls increases from the bottom of said bin toward the top of said bin;

first and second top wall sections connecting said front and rear walls and forming with said front and rear walls a tape inlet disposed above said second side wall, said first top wall section including a tape outlet aperture disposed above said bottom wall;

first guide means for guiding said tape through said tape inlet into said bin;

second means for guiding said tape through said tape outlet out of said bin; and means including a manifold attached to said bottom and second side walls for introducing a pressurized fluid through said first and second pluralities of apertures into said bin so as to establish a pressure gradient in said bin in order to pneumatically support the tape accumulating in said bin above said bottom wall and said second side wall;

wherein the interior of said bin is constructed free of obstructions so that said tape guided through said tape inlet into said bin can free fall into engagement with said second side wall.

2. Apparatus according to claim 1, wherein said second side wall is inclined at an angle of approximately 135° relative to said bottom wall.

3. Apparatus according to claim 1 wherein said bottom wall and said first side wall are horizontal and vertical respectively.

4. Apparatus according to claim 1, wherein said first guide means is arranged so that tape free falling through said tape inlet into said bin will be intercepted by said second side wall.

5. Apparatus according to claim 1 further including means for feeding an endless tape into and out of said bin via said first and second guide means at a high speed.

6. Apparatus according to claim 1 wherein said second guide means is disposed so that tape is removed from the bottom of said bin along said first side wall.

* * * * *